US009104429B2

(12) United States Patent
Maxfield

(10) Patent No.: US 9,104,429 B2
(45) Date of Patent: Aug. 11, 2015

(54) METHODS AND APPARATUS FOR PERFORMING DATABASE MANAGEMENT UTILITY PROCESSES

(75) Inventor: John D. Maxfield, Cedar Park, TX (US)

(73) Assignee: BMC SOFTWARE, INC., Houston, TX (US)

( * ) Notice: Subject to any disclaimer, the term of this patent is extended or adjusted under 35 U.S.C. 154(b) by 129 days.

(21) Appl. No.: 13/251,101

(22) Filed: Sep. 30, 2011

(65) Prior Publication Data

US 2013/0085985 A1     Apr. 4, 2013

(51) Int. Cl.
*G06F 17/30*     (2006.01)
*G06F 9/44*     (2006.01)
*G06F 9/50*     (2006.01)
*G06F 9/48*     (2006.01)

(52) U.S. Cl.
CPC .............. *G06F 9/44* (2013.01); *G06F 9/4843* (2013.01); *G06F 9/5044* (2013.01); *G06F 9/5066* (2013.01); *G06F 17/30* (2013.01)

(58) Field of Classification Search
USPC .......................................................... 712/28
See application file for complete search history.

(56) References Cited

U.S. PATENT DOCUMENTS

| 5,761,667 | A * | 6/1998 | Koeppen ................................ 1/1 |
| 6,182,080 | B1 * | 1/2001 | Clements ....................... 707/610 |
| 2002/0112079 | A1 * | 8/2002 | Yamamoto .................... 709/246 |
| 2002/0120721 | A1 * | 8/2002 | Eilers et al. .................. 709/220 |
| 2003/0037066 | A1 * | 2/2003 | Rothschild ................. 707/104.1 |
| 2004/0193794 | A1 * | 9/2004 | Kanda et al. .................. 711/112 |
| 2008/0263640 | A1 * | 10/2008 | Brown .............................. 726/5 |
| 2009/0276448 | A1 * | 11/2009 | Coleman ....................... 707/101 |
| 2010/0281307 | A1 * | 11/2010 | Ng ................................... 714/40 |
| 2011/0041006 | A1 * | 2/2011 | Fowler ............................ 714/10 |
| 2012/0144157 | A1 * | 6/2012 | Crew et al. ..................... 712/30 |

OTHER PUBLICATIONS

Article entitled "BMC reveals "free money" mainframe and DB2 tools" by Morgan, dated May 24, 2010.*
"Accessing VSAM and AS1400 Files", Microsoft, retrieved from http://web.archive.org/web/20110430042548/http://msdn.microsoft.com/en-us/library/aa266490(v=vs.60).aspx, Apr. 30, 2011, 2 pages.

* cited by examiner

*Primary Examiner* — Mahesh Dwivedi
(74) *Attorney, Agent, or Firm* — Brake Hughes Bellermann LLP

(57) ABSTRACT

In one general aspect, a computer-readable storage medium can be configured to store instructions that when executed cause a processor to perform a process. The instructions can include instructions to identify, at a mainframe computing environment during an initiation phase associated with a management utility process, a set of tasks for implementing the management utility process, and instructions to send, to a non-mainframe computing environment, a description identifying at least a portion of the set of tasks. The instructions can also include instructions to receive an indicator, at the mainframe computing environment, that processing based on the at least the portion of the set of tasks associated with the management utility process has been completed, and instructions to execute a termination phase of the management utility process at the mainframe computing environment in response to the indicator.

20 Claims, 4 Drawing Sheets

METHODS AND APPARATUS FOR PERFORMING DATABASE MANAGEMENT UTILITY PROCESSES

TECHNICAL FIELD

The subject matter of the present disclosure relates to handling of database management utility processes.

BACKGROUND

A database management system (DBMS) can be configured to manage large databases and provide an operational environment in which stored information can be accessed (e.g., retrieved) and/or modified (e.g., updated). In one type of DBMS, which can be referred to as a relational database system, information can be stored in tables where each table can have one or more columns and one or more rows. Each column in a table can be referred to as an attribute of the table, and each row in a table can be referred to as a record. One known example of a relational database management system is a DB2 database system.

Various types of database management utility processes can be used to manipulate data stored in one or more DB2 database systems. In known systems, these database management utility processes can consume a significant quantity of processing resources (e.g., hardware resources, software resources) of a mainframe computing system that can be measured in millions of instructions per second (MIPS). Because the processing resources of known mainframe computing systems can be relatively expensive (relative to non-mainframe computing resources), operating database management utility processes at these mainframe computing systems can be expensive. As processing needs continue to increase, customers are continually seeking for ways to reduce the costs associated with operation of mainframe computing resources. Thus, a need exists for systems, methods, and apparatus to address the shortfalls of present technology and to provide other new and innovative features.

SUMMARY

In one general aspect, a computer-readable storage medium can be configured to store instructions that when executed cause a processor to perform a process. The instructions can include instructions to identify, at a mainframe computing environment during an initiation phase associated with a management utility process, a set of tasks for implementing the management utility process, and instructions to send, to a non-mainframe computing environment, a description identifying at least a portion of the set of tasks. The instructions can also include instructions to receive an indicator, at the mainframe computing environment, that processing based on the at least the portion of the set of tasks associated with the management utility process has been completed, and instructions to execute a termination phase of the management utility process at the mainframe computing environment in response to the indicator.

In another general aspect, an apparatus can include a mainframe computing device including an initiation manager configured to identify a database object processing task associated with a management utility process. The apparatus can also include a non-mainframe computing device configured to execute the database object processing task, and configured to send, to the mainframe computing device, an indicator that execution of the database object processing task has been completed. The mainframe computing device can include a termination manager configured to receive the indicator that the database object processing task has been completed, and configured to terminate the management utility process in response to the indicator.

In yet another general aspect, a computer-readable storage medium can be configured to store instructions that when executed cause a processor to perform a process. The instructions can include instructions to receive, at a non-mainframe computing environment, an identifier of a database object and a description of a task for processing the database object, and instructions to access the database object at a storage device via a storage interface. The instructions can also include instructions to process the database object at the non-mainframe computing environment based on the task, and instructions to send an indicator, to a mainframe computing environment, that processing based on the task has been completed.

The details of one or more implementations are set forth in the accompanying drawings and the description below. Other features will be apparent from the description and drawings, and from the claims.

DETAILED DESCRIPTION

Figure 1:
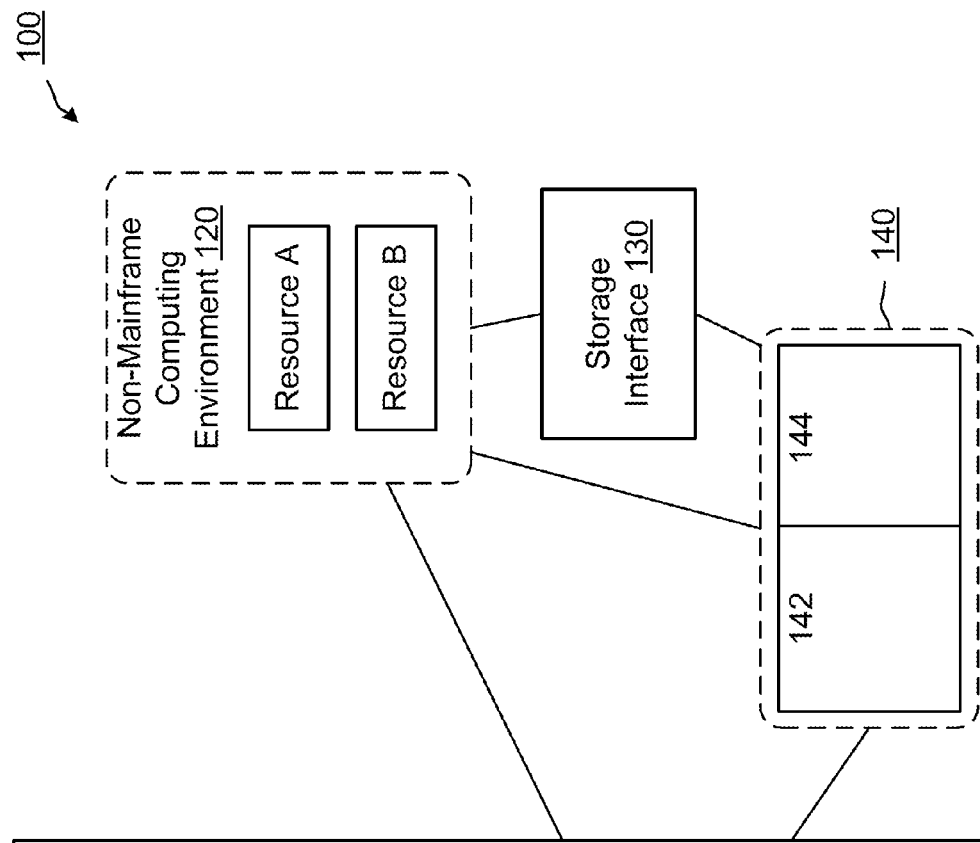
FIG. 1 is a diagram that illustrates a database management system, according to an embodiment.

FIG. 1 is a diagram that illustrates a database management system 100, according to an embodiment. As shown in FIG. 1, the database management system 100 includes a mainframe computing environment 110 (or device) configured to communicate with a non-mainframe computing environment 120 (or device). Also, the non-mainframe shooting environment 120 is configured to access a storage device 140 via a storage interface 130. In some embodiments, the storage interface 130 can be a storage interface device, or can be a storage interface module configured to operate at (e.g., operate within) the non-mainframe computing environment 110. In some embodiments, the storage interface 130 can be referred to as a storage system interface. In some embodiments, the storage device 140 can be, or can include, any type of memory. In some embodiments, storage device 140 can be a database, a set of databases, a remote storage device, a local storage device, a disk drive, a random-access memory (RAM), and/or so forth.

In some embodiments, the database management system 100 can be any type of database system (e.g., a database system using a storage interface 130) such as a DB2 database system, a non-DB2 database system, an Information Management System (IMS) database system, a database/storage system based on various type of z/OS file formats (e.g., virtual storage access method (VSAM) file formats, basic sequential access method (BSAM) file formats), and so forth. The mainframe computing environment 110 can be referred to as a mainframe computing environment because the mainframe computing environment 110 is based on a mainframe platform. For example, the mainframe computing environment 110 can be configured to operate based on a 32-bit operating system, or a 64-bit operating system for a mainframe computer such as z/OS.

In contrast, the non-mainframe computing environment 120 can be referred to as a non-mainframe computing environment because the non-mainframe computing environment 120 is based on a non-mainframe platform. For example, the non-mainframe computing environment 120 can be configured to operate based on a Windows operating system, a LINUX operating system, and/or a UNIX operating system. In this embodiment, the non-mainframe computing environment 120 includes multiple resources (e.g., computing resources, processing resources) shown as resource A and resource B. In some embodiments, each of the resources can be referred to as a non-mainframe computing device. In some embodiments, the non-mainframe computing environment 120 can include more or less resources than shown in FIG. 1

As shown in FIG. 1, the mainframe computing environment 110 includes a management utility module 150. The management utility module 150 is configured to manage processing (e.g., processing cycles) of a management utility process. The management utility module 150 is configured to delegate (e.g., offload) at least some portions of the processing (e.g., processing cycles) related to a management utility process to the non-mainframe computing environment 120. In some embodiments, the management utility process can include any type of utility process related to management of data within the database management system 100. Specifically, the management utility process can be configured to process (e.g., access, manipulate, modify) one or more objects stored in the storage device 140. In some embodiments, the objects stored in the storage device 140 can be referred to as data objects or as database objects. In some embodiments, the objects can be stored in files. If the database management system 100 is a DB2 system for z/OS, the object can be managed using z/OS file services implemented by, for example, a DB2 subsystem (e.g., subsystem 190).

For example, in some embodiments, a management utility process can be, or can include, an UNLOAD process (e.g., an UNLOAD management utility process) configured to read, process, and/or produce a flat file from a database object (e.g., a DB2 database object) stored in the storage device 140. In some embodiments, a management utility process can be, or can include a LOAD process (e.g., a LOAD management utility process) configured to read a flat file and produce a database object (e.g., a DB2 database object) for storage in the storage device 140. In some embodiments, a management utility process can be, or can include a REORG process (e.g., a REORG management utility process) that can be a combination of an UNLOAD process and a LOAD process, or vice versa. In some embodiments, a management utility process can be, or can include, a CHECK process (e.g., a CHECK management utility process) configured to identify (e.g., check) data integrity issues related to objects stored in the storage device 140. In some embodiments, one or more management utility processes can be triggered by a user (e.g., an administrator) of the database management system 100, generated by one or more applications operating in conjunction with the database management system 100, generated based on a schedule of management utility processes to be executed at the database management system 100, and/or so forth. In some embodiments, other types of management utility processes (e.g., a COPY management utility process, a RECOVER management utility process, a LOG management utility process, etc.) can be handled by the database management system 100 (e.g., managed by the mainframe computing environment 110) shown in FIG. 1.

Because the mainframe computing environment 110 can be configured to delegate processing (at least a portion of processing) to the non-mainframe computing environment 120, computing resources (e.g., processing resources, hardware resources, software resources, execution cycles measured in millions of instructions per second (MIPS)) associated with the non-mainframe computing environment 110 can be used instead of computing resources associated with the mainframe computing environment 110 to perform (e.g., execute, complete) one or more management utility processes. In other words, the computing resources of the non-mainframe computing environment 120 can be used instead of the computing resources of the mainframe computing environment 110 to handle processing related to a management utility process. Said differently, a ratio of processing performed at the non-mainframe computing environment 120 and performed at the mainframe computing environment 110 within the database management system 100 can be changed (e.g., increased).

Accordingly, the computing resources of the mainframe computing environment 110 are not used and can be reserved for other types of processing. In some implementations, the computing resources of the mainframe computing environment 110 can be relatively expensive (e.g., expensive from a computing resource perspective, expensive from a cost perspective) to operate compared with the computing resources of the non-mainframe computing environment 120. Thus, by offloading processing from mainframe computing environment 110 to the non-mainframe computing environment 120, the overall cost of operation of the database management system 100 can be reduced compared with scenarios where processing is not offloaded from the mainframe computing environment 110 to the non-mainframe computing environment 120.

In this embodiment, the mainframe computing environment 110 can be configured to manage processing of (e.g., execution of) a management utility process in phases. Specifically, management of one or more management utility processes can be handled during an initiation phase, a distribution phase, and a termination phase. During the initiation phase, various types of information for initiation of a management utility process is retrieved (e.g., collected) and/or defined within the mainframe computing environment 110. During the distribution phase, processing related to the management utility process (based on the information for initiation of the management utility process) can be delegated from the mainframe computing environment 110 to the non-mainframe computing environment 120. During the termination phase, the mainframe computing environment 110 can be configured to terminate processing related to the management utility process after processing related to the distribution phase has been completed at the non-mainframe computing environment 120. During the initiation phase, the distribution phase, and/or the termination phase, the mainframe computing environment 110 and/or the non-mainframe computing environment 120 can be configured to update database catalog information (e.g., DB2 catalog information), manage database objects and/or file structures, and/or so forth. In some embodiments, access to one or more database objects (e.g., DB2 objects) during the initiation phase, the distribution phase, and/or the termination phase can be serialized or performed in parallel.

An initiation manager 160 of the management utility module 150 can be configured to perform various functions during an initiation phase related to a management utility process. The initiation manager 160 includes a management utility process identifier 162 configured to receive one or more indicators (e.g., requests) that a management utility process is to be executed. In some embodiments, the indicator(s) can include, or can be included in, a description of the management utility process. For example, the one or more indicators can include, for example, an identifier of a type of management utility process to be executed (such as an UNLOAD, LOAD, REORG, and/or CHECK management utility process), a name of the management utility process, an owner of the management utility process, a schedule (e.g., a date-time stamp) for executing management utility process, and/or so forth. In some embodiments, the indicator can be generated by a user (e.g., an administrator) operating the database management system 100, generated by one or more applications operating in conjunction with the database management system 100, generated based on a schedule of management utility processes to be executed at the database management system 100, and/or so forth.

During the initiation phase, one or more objects (e.g., database objects) to be processed based on the management utility process can be identified by an object identifier 163 of the initiation manager 160. In some embodiments, a description of the management utility process received by the management utility process identifier 162 can include one or more indicators of an object to be processed based on the management utility process. In some embodiments, the one or more indicators can include, for example, a location (e.g., a memory location, an address) of the object, an identifier (e.g., a name) of the object, a size of the object, a description of data stored as the object, a structure of the object, a format (e.g., a storage format, a file format) of the object, and/or so forth In some embodiments, the object identifier 163 can be configured to perform various types of processing to identify one or more objects to be processed based on the management utility process. For example, the management utility process identifier 162 can be configured to determine that an UNLOAD management utility process is to be executed with respect to an object stored in the storage device 140. The object identifier 163 can be configured to determine the specific object to be processed (e.g., accessed, retrieved) based on the UNLOAD management utility process. The object identifier 163 can be configured to access the storage device 140 to identify a location, a format, and/or so forth of the object.

A task generator 164 of the initiation manager 160 can be configured to identify one or more tasks (which can be referred to as a set of tasks) associated with (e.g., for implementing) the management utility process. The management utility process can be divided into discrete tasks, that when executed, can result in completion of the management utility process. For example, a first task associated with an UNLOAD management utility process can include reading data of an object having a particular format, and a second task associated with the UNLOAD management utility process can include translating or transferring the data to an object have being a different format. As another example, multiple tasks such as reading several objects from the storage device 140 can be performed in parallel, and the several objects that are read in parallel can later be combined into another object (based on another task). Accordingly, in some embodiments, one or more tasks associated with management utility process can be tasks that can be performed in parallel or can be tasks that are to be performed serially. In some embodiments, a task can be referred to as a database object processing task.

In some embodiments, a task associated with management utility process can be referred to as an attached task. In some embodiments, an attached task is a task that can be configured for execution on the mainframe computing environment 110 to perform a management utility process on one or more database objects (e.g., one or more DB2 objects in parallel). In this embodiment, the attached task can be delegated by the mainframe computing environment 110 to the non-mainframe computing environment 120 for processing (e.g., for execution).

As shown in FIG. 1, the initiation manager 160 includes a computing resource detector 165. The computing resource detector 165 is configured to identify resources within the non-mainframe computing environment 120 to process one or more tasks associated with the management utility process. In some embodiments, the computing resource detector 164 can be configured to query the non-mainframe computing environment 120 about resources available for (or that will be available for) processing related to a management utility process, and can be configured to receive (in response to the query) one or more indicators (e.g., responses) of resources that are available for processing related to the management utility process.

After the initiation phase associated with a management utility process has been completed, processing associated with a distribution phase can be started. During the distribution phase, a distribution manager 170 of the management utility module 150 is configured to send one or more parameter values in a delegation instruction (also can be referred to as an execution instruction) to the non-mainframe computing environment 120 so that the non-mainframe computing environment 120 can perform processing associated with a management utility process. The delegation instruction(s) can be an instruction(s) configured to trigger the non-mainframe computing environment 120 to perform a specific task.

For example, after the task generator 164 has identified one or more tasks associated with a management utility process during an initiation phase, the computing resource detector 164 can be configured to identify resources within the non-mainframe computing environment 120 available to process the one or more tasks. The distribution manager 170 can be configured to assign a specific task for processing at a specific resource (e.g., a specific device, a specific processor) of the non-mainframe computing environment 120 in one or more delegation instructions. In other words, a task can be specifically delegated to a particular resource of the non-mainframe computing environment 120. Although not shown in FIG. 1, in some embodiments, the distribution manager 170 can include a delegation instruction generator configured to define one or more delegation instructions.

For example, a first database object can be accessed from the storage device 140 and modified by the non-mainframe computing environment 120 (or resource thereof) based on a task description included in a delegation instruction. A second database object, which can be a result of the accessing and modifying, can be stored in the storage device 140. In some embodiments, the second database object can be referred to as a resulting database object or as a modified version of the database object. In some embodiments, the second database object can be a different database object type (e.g., a flat file database object type, a DB2 database object type) and/or can be stored using a different storage format (e.g., a count key data (CKD) storage format, any type of z/OS storage format, a fixed block architecture (FBA) storage format) than the first database object. More details related to handling of objects types and/or storage formats are described after FIG. 2.

Figure 2:
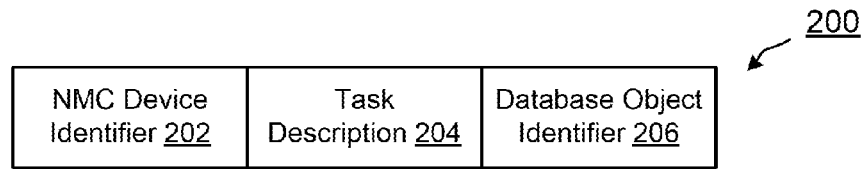
FIG. 2 is a diagram that illustrates a delegation instruction.

An example of parameter values to be sent to the non-mainframe computing environment 120 in a delegation instruction from the mainframe computing environment 110 to trigger processing associated with a management utility process at the non-mainframe computing environment 120 are shown in FIG. 2. As shown in FIG. 2, a delegation instruction 200 can include various types of parameter values that can be defined and sent from the distribution manager 170 to the non-mainframe computing environment 120 during a distribution phase. Processing can be performed at the non-mainframe computing environment 120 based on the parameter values included in the delegation instruction 200. In this example embodiment, the delegation instruction 200 includes a non-mainframe computing (NMC) resource identifier 202, a task description 204, and a database object identifier 206. The task description 204 can be a description of a task associated with a management utility process and to be processed at the mainframe computing environment 120. The non-mainframe computing resource identifier 202 can be an identifier of the resource to be used to execute the task described in the task description 204. The database object identifier 206 can be an identifier of a database object to be processed based on the task described within the task description 204.

Although not shown in FIG. 2, the delegation instruction 200 can include additional parameter values. For example, the delegation instruction 200 can include a schedule for executing a task included in the task description 204, a time frame within which to perform processing, a storage format and/or location for storing the database object identified by the database object identifier 206 within the storage device 140, a time frame within which completion processing is to be reported, and/or so forth. In some embodiments, the delegation instruction 200 can include parameter values related to multiple tasks to be performed in parallel and/or serially, multiple non-mainframe computing resources to perform one or more tasks, multiple identifiers of database objects, and/or so forth. In other words, multiple instructions can be included in a single delegation instruction. In some embodiments, the distribution manager 170 can be configured to define multiple delegation instructions (similar to delegation instruction 200) for one or more management utility processes.

Referring back to FIG. 1, in some embodiments, processing associated with a distribution phase of a management utility process can overlap with the processing associated with an initiation phase of the management utility process. For example, a first portion of tasks associated with a management utility process can be identified during an initiation phase by the initiation manager 160. A first delegation instruction associated with the first portion of tasks can be defined and sent from the distribution manager 170 during a distribution phase of the management utility process even though a second portion of tasks associated with the management utility process have not yet been identified during the initiation phase by the initiation manager 160. Accordingly, the initiation phase can have some overlap with the distribution phase of the management utility process. After the second portion of tasks associated with the management utility process, the initiation phase can be completed and the distribution manager 170 can be configured to define a second delegation instruction associated with the second portion of tasks during the distribution phase.

As shown in FIG. 1, a termination manager 180 of the management utility module 150 is configured to perform one or more functions associated with a termination phase of a management utility process. Specifically, the termination manager 180 includes a completion detector 182 configured to receive one or more indicators that processing at the non-mainframe computing environment 120 associated with one or more tasks of a management utility process have been completed. The termination manager 180 can be configured to terminate processing associated with a management utility process after all tasks delegated for processing at the non-mainframe computing environment 120 have been completed. In some embodiments, an indicator that a task has been completed can be referred to as a completion indicator.

For example, a set of tasks associated with a management utility process (e.g., a CHECK management utility process) can be delegated for processing at the non-mainframe computing environment 120 from the mainframe computing environment 110 (during an initiation phase and a distribution phase). In response to receiving indicators (e.g., completion indicators) at the completion detector 182 that all of the tasks from the set of tasks have been completed, the termination manager 180 can be configured to terminate (e.g., closeout) processing associated with management utility process.

In some embodiments, the termination manager 180 can be configured to terminate processing associated with a management utility process even though a completion indicator associated with a particular task of the management utility process has not been received. For example, the termination manager 180 can be configured to terminate processing associated with a management utility process when a time period for completing the management utility process has been expired. In other words, the termination manager 180 can be configured to terminate processing (e.g., release an object (and file) after processing has been completed, deserialize an object (and file)) associated with the management utility process in response to a timeout being triggered.

By delegating processing from the mainframe computing environment 110 to the non-mainframe computing environment 120, the computing resources of the mainframe computing environment 110 are not used and can be reserved for other types of processing. The processing rate (related to a management utility process) of the mainframe computing environment 110 can be decreased relative to the processing rate (related to a management utility process) of the non-mainframe computing environment 120 in response to the transition from the initiation phase to the distribution phase. Similarly, the processing rate (related to a management utility process) of the mainframe computing environment 110 can be increased relative to the processing rate (related to a management utility process) of the non-mainframe computing environment 120 in response to the transition from the distribution phase to the termination phase.

As shown in FIG. 1, the non-mainframe computing environment 120 can be configured to access storage device 140 via a storage interface 130. The storage interface 130 can be configured to translate (e.g., convert) one or more database objects (e.g., database files) stored in the storage device 140 from a first format (e.g., a mainframe computing environment storage format, a mainframe computing environment database object format, a count key data (CKD) storage format) to a second format (e.g., a non-mainframe computing environment storage format, a non-mainframe computing environment database object format, a fixed block architecture (FBA) storage format).

Specifically, the storage interface 130 can be configured to translate one or more of the database objects from a first storage format to a second storage format. In some embodiments, the non-mainframe computing environment 120 may be configured to compatibly process one or more database objects based on a first storage format, but may not be configured to compatibly process one or more database objects based on a second storage format. Accordingly, the storage interface 130 can be configured to translate (e.g., convert) one or more database objects based on the second storage format into the first storage format so that the non-mainframe computing environment 120 may perform processing on the one or more database objects. In some embodiments, the database objects can be flat file objects, DB2 database objects, and/or so forth, stored using one or more storage formats.

As a specific example, the non-mainframe computing environment 120 can be configured to receive a delegation instruction that can include a description of the task for processing a database object. The database object can be stored in the storage device 140 based on a mainframe storage format that is compatible with the mainframe computing environment 110 and incompatible with the non-mainframe computing environment 120. The database object may be a database object that is typically processed by the mainframe computing environment 110, which can compatibly process the database object based on the mainframe storage format. Because processing associated with the task is being delegated to the non-mainframe computing environment 120 from the mainframe computing environment 110, the database object can be a database object that is incompatible with the non-mainframe computing environment 120. Accordingly, the non-mainframe computing environment 120 can be configured to trigger the storage interface 130 to access the database object, which may not be directly accessed by the non-mainframe computing environment 120 because of the incompatibilities. After the database object has been accessed for the non-mainframe computing environment 120 via the storage interface 130, processing of the database object based on the description of the task can proceed. After processing based on the description of the task has been completed, the non-mainframe computing environment 120 can be configured to store a resulting database object via the storage interface 130. In some embodiments, the resulting database object can be stored using a storage format compatible with the non-mainframe computing environment 120 and/or compatible with the mainframe computing environment 110. Accordingly, the resulting database object can be stored using a variety of storage formats.

As another specific example, the non-mainframe computing environment 120 can be configured to receive a delegation instruction that can include a description of the task for processing a database object. The database object can be stored in the storage device 140 based on a non-mainframe storage format that is compatible with the non-mainframe computing environment 120 and incompatible with the mainframe computing environment 110. Because the database object is stored based on a compatible non-mainframe storage format, the non-mainframe computing environment 120 can be configured to directly access the database object from the storage device 140 without using the storage interface 130. After processing the database object, the non-mainframe computing environment 120 to trigger the storage interface 130 to store the database object based on a storage format that is compatible with the mainframe computing environment 110 (i.e., based a mainframe storage format).

Database objects stored using a first storage format are represented as portion 142 of the storage device 140, and database objects stored using a second storage format are represented as portion 144 of the storage device 140. In some embodiments, database objects stored using (e.g., based on) a first storage format or a second storage format can be stored physically within any location within the storage device 140. In some embodiments, a delegation instruction can include instructions (within a task) related to a storage format in which a database object (before being modified or after being modified) should be accessed and/or stored.

In some embodiments, the storage interface 130 can be configured to translate different database object types (e.g., a flat file database object type, a DB2 database object type). For example, in some embodiments, the storage interface 130 can be configured to translate a flat file into a DB2 database object, and vice versa.

As shown in FIG. 1, the initiation manager 160 can include a data integrity manager 166 configured to handle various types of signaling and/or processing related to data integrity so that objects stored in the storage device 140 can be processed in a desirable fashion (e.g., with data consistency, without collisions by processing by performed other processes). For example, the data integrity manager 166 can be configured perform and/or request serialization, which can include, for example, queuing of processing (or processes), locking of objects for processing, creation of mirrored/shadowed copies, and/or so forth. In some embodiments, serialization can be performed with respect to a portion of an object or on file associated with (e.g., including) the object.

In some embodiments, a subsystem 190 can be configured to manage serialization related to one or more objects stored in the storage device 140. In some embodiments, the subsystem 190 can be a z/OS environment or a portion thereof (e.g., a DB2 subsystem operating within the z/OS environment of the mainframe computing environment 110). In some embodiments, one or more requests related to serialization can be sent from the data integrity manager 166 to the subsystem 190 (e.g., a DB2 subsystem), which can be configured to actually perform one or more steps related to data integrity (e.g., serialization). The management utility module 150 (e.g., the initiation manager 160) can be configured to request that the subsystem 190 manage the data integrity (e.g., serialization) a particular fashion.

For example, the initiation manager 160 can be configured to request that a particular objects stored in the storage device 140 (e.g., stored in portion 144 of the source device 140) be reserved (e.g., locked, allocated) for processing based on a management utility process (e.g., an UNLOAD management utility process, a LOAD management utility process, a REORG management utility process, a CHECK management utility process, a COPY management utility process, a RECOVER management utility process, a LOG management utility process) by the management utility module 150. Accordingly, when processing associated with management utility process is delegated to the non-mainframe computing environment 120, the object will be available for (e.g., will be locked and in a location for) processing based on the management utility process. Thus, other components (e.g., modules, processes) attempting to modify (e.g., access, write to) the object may not be permitted to do so.

In some embodiments, a subsystem 190 can be configured to delegate certain rights related to an object stored in the storage device 140 based on processing to be performed on the object. For example, in some embodiments, the subsystem 190 may delegate read-only access to a management utility process targeted for processing of an object. In some embodiments, the subsystem 190 can be configured to grant rights for processing of an object based on a management utility process commensurate with the scope of the management utility process.

In some embodiments, the data integrity manager 166 of the initiation manager 160 can be configured to request a particular type of access (or right) to an object stored in the storage device 140. For example, the initiation manager 160 can be configured to request read-only access to an object stored in storage device 140 in conjunction with the management utility process. In such embodiments, write access related to the object may not be allocated during processing based on the management utility process (which can be delegated to the non-mainframe computing environment 120 from the mainframe computing environment 110).

In some embodiments, other processes that are associated with, for example, applications operating within the subsystem 190 may be accessing objects that are the target of a management utility process being managed by the management utility module 150. In such embodiments, the subsystem 190 can be configured to manage (e.g., queue) the management utility process with respect to the other processes (to maintain data integrity).

As a specific sample, the data integrity manager 166 of the initiation manager 160 can be configured to request access to an object (or a portion thereof (e.g., a set of pages of the object)) for processing based on a management utility process while processing of the object (or a portion thereof) by an application operating at the subsystem 190 is already in progress. The object (or a portion thereof) may be temporarily stored in a memory 192 (e.g., a random-access memory, a local memory, a remote memory) of the subsystem 190 from the storage device 140 so that processing by the application may be performed. In response to the request to access the object (or a portion thereof) from the data integrity manager 166, the subsystem 190 may interrupt (e.g., pause, terminate) processing performed by the application and move the object (or a portion thereof) temporarily stored in the memory 192 of the subsystem 190 back into the storage device 140 where processing based on the management utility process can be performed by, for example, the non-mainframe computing environment 120.

In some embodiments, in response to the request to access the object (or a portion thereof) from the data integrity manager 166, the subsystem 190 may allow the application to complete processing performed by the application before the object (or a portion thereof) is moved from the memory 192 of the subsystem 190 back into the storage device 140 where processing based on the management utility process can be performed by, for example, the non-mainframe computing environment 120. In response to the request to access the object (or a portion thereof) from the data integrity manager 166, the subsystem 190 may move a copy of the object (or a portion thereof) into the storage device 140 where limited processing based on the management utility process can be performed by, for example, the non-mainframe computing environment 120 so that processing by the application at the subsystem 190 may continue. For example, the copy of the object (or a portion thereof) can be moved to the storage device 140 so that reading (but not writing) of the object can be performed by the management utility process.

In some embodiments, the movement of one or more objects (or portions thereof) from the memory 192 back into the storage device 140 can be referred to as externalization (which can be a type of data integrity processing). In some embodiments, externalization of one or more objects (or portions thereof) can be requested by the data integrity manager 166 of the initiation manager 160 so that the object(s) can be processed based on a management utility process managed by the management utility module 150.

In some embodiments, the non-mainframe computing environment 120 and/or the storage device 140 can include a data integrity manager, such as the data integrity manager 166, so data integrity processing such as serialization, externalization, and/or so forth can be handled outside of the mainframe computing environment 110. For example, when processing of an object is requested by the non-mainframe computing environment 120, the storage device 140 can be configured to perform or a request that the mainframe computing device 110 (e.g., the subsystem 190 of the mainframe computing device 110) perform data integrity processing such as serialization and/or externalization with respect to the object. Similarly, when processing of an object is requested by the non-mainframe computing environment 120, the non-mainframe computing environment 120 can be configured to perform or a request that the mainframe computing device 110 (e.g., the subsystem 190 of the mainframe computing device 110) perform operations such as serialization and/or externalization with respect to the object.

In some implementations, the mainframe computing environment 110 and/or the non-mainframe computing environment 120 can be configured to operate at a host device. In such implementations, the mainframe computing environment 110 and/or the non-mainframe computing environment 120 can communicate through a network (not shown). In some embodiments, the functionality of the mainframe computing environment 110 and/or the functionality of the non-mainframe computing environment 120 can be called and/or executed on an on-demand basis. In some implementations, the mainframe computing environment 110 and/or the non-mainframe computing environment 120 can function as a background application operating within the database management system 100. In some implementations, the mainframe computing environment 110 and/or the non-mainframe computing environment 120 can function as an application (or service) that can be accessed via an application programming interface (API).

The mainframe computing environment 110 and/or the non-mainframe computing environment 120 can be, or can include, any type of hardware and/or software configured to operate within the database management system 100. In some implementations, one or more portions of the components shown in the mainframe computing environment 110 and/or the non-mainframe computing environment 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the mainframe computing environment 110 and/or the non-mainframe computing environment 120 can be, or can include, a software module configured for execution by at least one processor (not shown). In some implementations, the functionality of the components can be included in different modules and/or different components than those shown in FIG. 1. For example, although not shown, the functionality of the management utility module 150 can be included in a different module than the management utility module 150, or can be divided into several different modules.

Although not explicitly shown in FIG. 1, the mainframe computing environment 110 and/or the non-mainframe computing environment 120 can include various types of hardware and/or software components to facilitate processing. For example, the mainframe computing environment and/or the non-mainframe computing environment 120 can include one or more input/output (I/O) ports, a communication manager configured to handle various communication protocols (e.g., transmission control protocol (TCP)/Internet protocol (IP) protocol), a message manager configured to handle notifications (e.g., notifications to a user, alarms), a persistent processor configured to monitor various indicators, requests, and/or signaling, a compression and/or expansion manager configured to handle data (e.g., data of database object) compression and/or expansion (e.g., decompression), a translation manager configured to translate file formats and/or data formats, and/or so forth. In some embodiments, the mainframe computing environment and/or the non-mainframe computing environment 120 can include a data management component configured to handle, for example, extensible mark-up language (XML) data, a large object (LOB) data manager, an indexer configured to handle indexing of the storage device 140 (e.g., database storage), a file manager configured to handle file systems, and/or so forth.

Although not shown, in some implementations, the mainframe computing environment 110 and/or the non-mainframe computing environment 120 (or portions thereof) can be configured to operate within, for example, a data center (e.g., a cloud computing environment), a computer system, one or more server/host devices, and/or so forth. Thus, the mainframe computing environment 110 and/or the non-mainframe computing environment 120 (or portions thereof) and/or the DB2 database environment 110 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The mainframe computing environment 110 and/or the non-mainframe computing environment 120 can be configured to operate based on one or more platforms (e.g., one or more similar or different platforms) that can include one or more types of hardware, software, firmware, operating systems, runtime libraries, and/or so forth. In some implementations, the mainframe computing environment 110 and/or the non-mainframe computing environment 120 can each represent a cluster of devices (e.g., a server farm). In such an implementation, the functionality and processing of the mainframe computing environment 110 and/or the non-mainframe computing environment 120 and/or the DB2 database environment 110 can be distributed to several devices of the cluster of devices.

Figure 3:
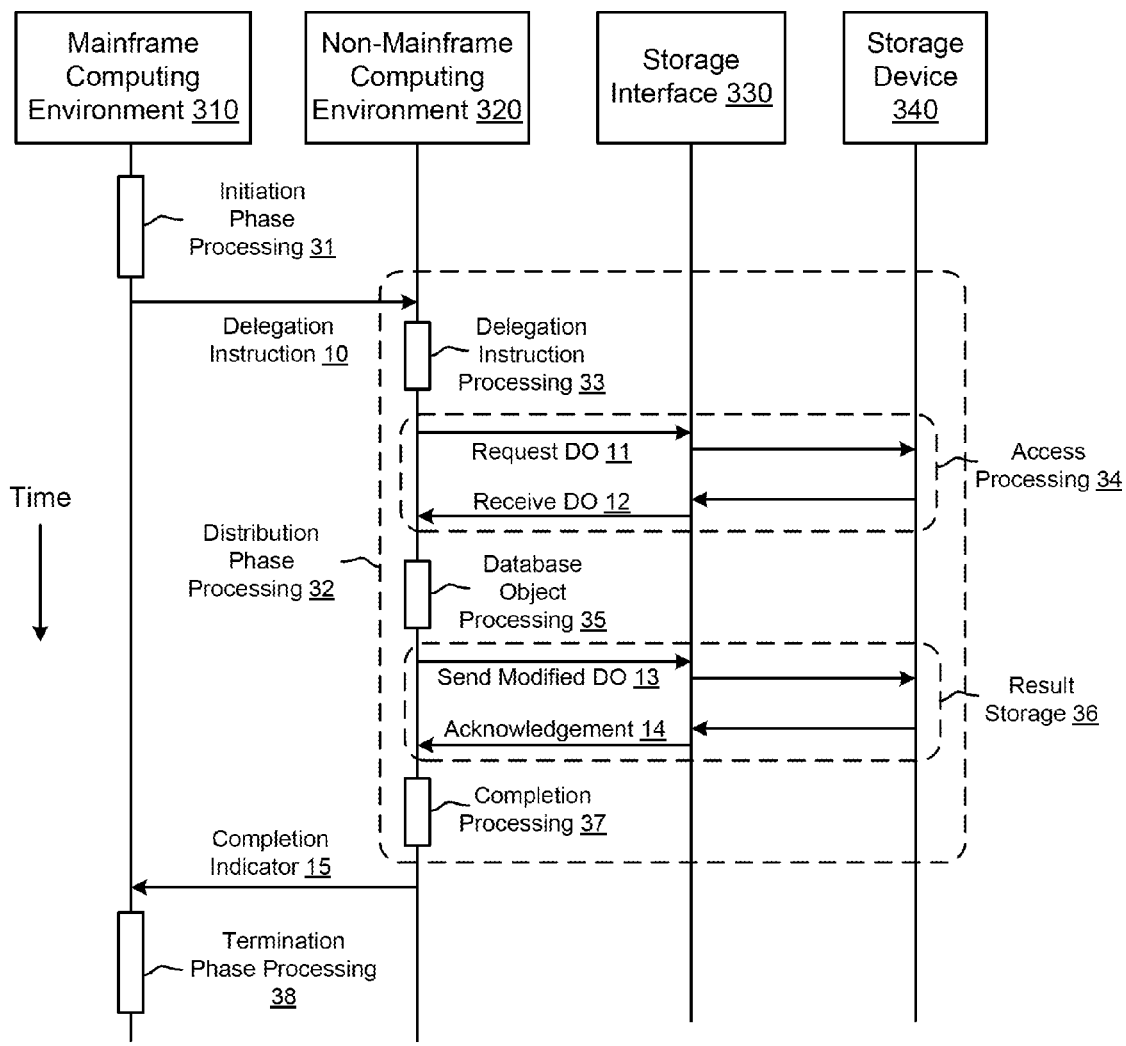
FIG. 3 is a diagram that illustrates signaling and processing associated with a management utility process.

FIG. 3 is a diagram that illustrates signaling and processing associated with a management utility process. The signaling and processing is performed at components of a database management system including a mainframe computing environment 310, a non-mainframe computing environment 320 (or a resource thereof), a storage interface 330, and a storage device 340. In this diagram, time is increasing in a downward direction.

As shown in FIG. 3, initiation phase processing 31 is performed at a mainframe computing environment 310. The initiation phase processing 31 can include identifying a management utility process to be executed, identifying one or more objects to be processed based on the management utility process, identifying tasks associated with (e.g., attached to) the management utility process, triggering data integrity processing, and/or identifying computing resources to perform the tasks associated with the management utility process.

As shown in FIG. 3, a delegation instruction 10 is sent from the mainframe computing environment 310 to the non-mainframe computing device 120. Distribution phase processing 32 is performed in response to the delegation instruction 10 being sent from the mainframe computing environment 310 to the non-mainframe computing environment 320 (or resource thereof).

In some embodiments, the delegation instruction 10 can include parameter values (e.g., identifiers of database objects, task descriptions) that can be used to delegate processing of one or more tasks from the mainframe computing environment 310 to the non-mainframe computing environment 320. In some embodiments, the delegation instruction 10 can be defined during the initiation phase processing 31 at the mainframe computing environment 310.

The non-mainframe computing environment 320 (or resource thereof) can be configured to receive and parse the delegation instruction 10 during delegation instruction processing 33. In response to the delegation instruction 10, the non-mainframe computing environment 320 can be configured to access a database object (identified within the delegation instruction 10) from a storage device 340 via a storage interface 330. Specifically, the non-mainframe computing environment 320 can be configured to request the database object (DO) 11, and can later receive the database object 12. The signaling associated with accessing of the database object is illustrated as access processing 34.

As shown in FIG. 3, database object processing 35 is performed in response to receipt of the database object 12. In some embodiments, the database object can be processed based on the description of the task included in the delegation instruction 10. For example, in some embodiments, the data included in the database object can be deleted, added, combined with data included in another database object, reformatted, structurally modified, and/or so forth.

After the database object has been processed based on the description of the task, a modified version of the database object can be sent for storage in the storage device 340 via the storage interface 330. An acknowledgment 14 that the modified version of the database object has been stored can be received at the non-mainframe computing environment 320. In some embodiments, the modified version of the database object can be referred to as a database object result or as a resulting database object. The signaling associated with storage of the modified database object is illustrated as result storage 36.

In some embodiments, accessing of the storage device 340 may be performed directly between the non-mainframe computing environment 320 and the storage device 340. In some embodiments, accessing of the storage device 340 may be performed directly between the non-mainframe computing environment 320 and the storage device 340 during the access processing 34 or during the result storage 36. In other words, the storage interface 330 may be bypassed during a portion of the distribution phase processing 32.

As shown in FIG. 3, after acknowledgement 14, completion processing 37 can be performed at the non-mainframe computing environment 320. In some embodiments, during the completion processing 37, a completion indicator 15 can be defined and sent from the non-mainframe computing environment 320 to the mainframe computing environment 310.

In response to the completion indicator 15 being received at the mainframe computing environment 310, termination phase processing 38 can be performed. During the termination phase processing 38, the management utility process (or a task thereof) can be terminated (or closed out).

In some embodiments, the distribution phase processing 32 can be performed with respect to several resources included in the non-mainframe computing environment 320. For example, multiple delegation instructions (such as delegation instruction 10) can be sent in parallel or serially to several resources included in the non-mainframe computing environment 320. One or more of the resources included in the non-mainframe computing environment 320 can be configured to access one or more storage devices (e.g., storage device 340) via one or more storage interfaces (e.g., storage interface 330).

Figure 4:
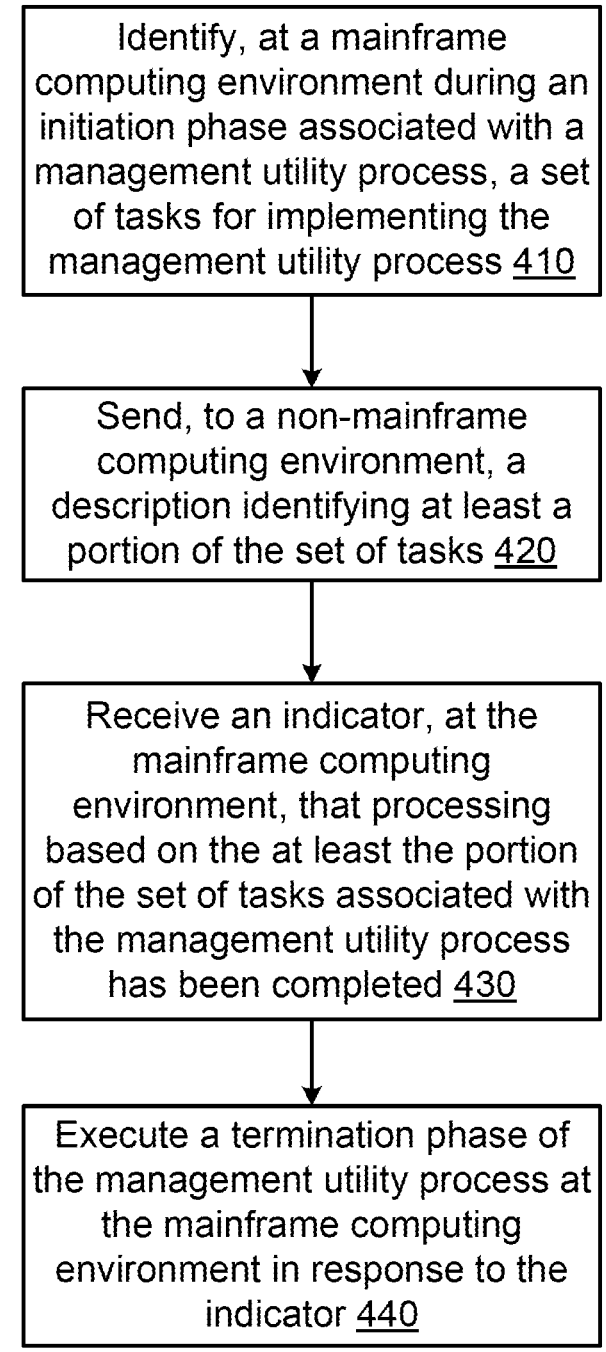
FIG. 4 is a flowchart that illustrates a method for executing a management utility process, according to an embodiment.

FIG. 4 is a flowchart that illustrates a method for executing a management utility process, according to an embodiment. One or more portions of the management utility process can be performed within a database management system (e.g., database management system 100 shown in FIG. 1).

As shown in FIG. 4, a set of tasks for implementing the management utility process are identified at a mainframe computing environment during an initiation phase associated with a management utility process (block 410). In some embodiments, the task generator 164 of the initiation manager 160 can be configured to identify at least a portion of the set of tasks after the management utility process has been identified by the management utility process identifier 162 of the initiation manager 160 shown in FIG. 1.

A description identifying at least a portion of the set of tasks can be sent to a non-mainframe computing environment (block 420). In some embodiments, the distribution manager 170 shown in FIG. 1 can be configured to define a delegation instruction including the description identifying the set of tasks during a distribution phase associated with the management utility process. In some embodiments, the distribution manager 170 can be configured to assign (during the distribution phase) at least a portion of the set of tasks to one or more resources included in the non-mainframe computing environment and identified (during the initiation phase) by the computing resource detector 164 shown in FIG. 1.

An indicator that processing based on the at least the portion of the set of tasks associated with the management utility process has been completed is received at the mainframe computing environment (block 430). In some embodiments, the indicator can be a completion indicator. In some embodiments, the termination manager 180 shown in FIG. 1 can be configured to receive the indicator.

A termination phase of the management utility process is executed at the mainframe computing environment in response to the indicator (block 440). In some embodiments, at least a portion of the termination phase of the management utility process can be executed by the completion detector 182 of the termination manager 180 shown in FIG. 1. In some embodiments, at least a portion of the set of tasks can be performed in parallel or serially at one or more resources of the non-mainframe computing environment.

Figure 5:
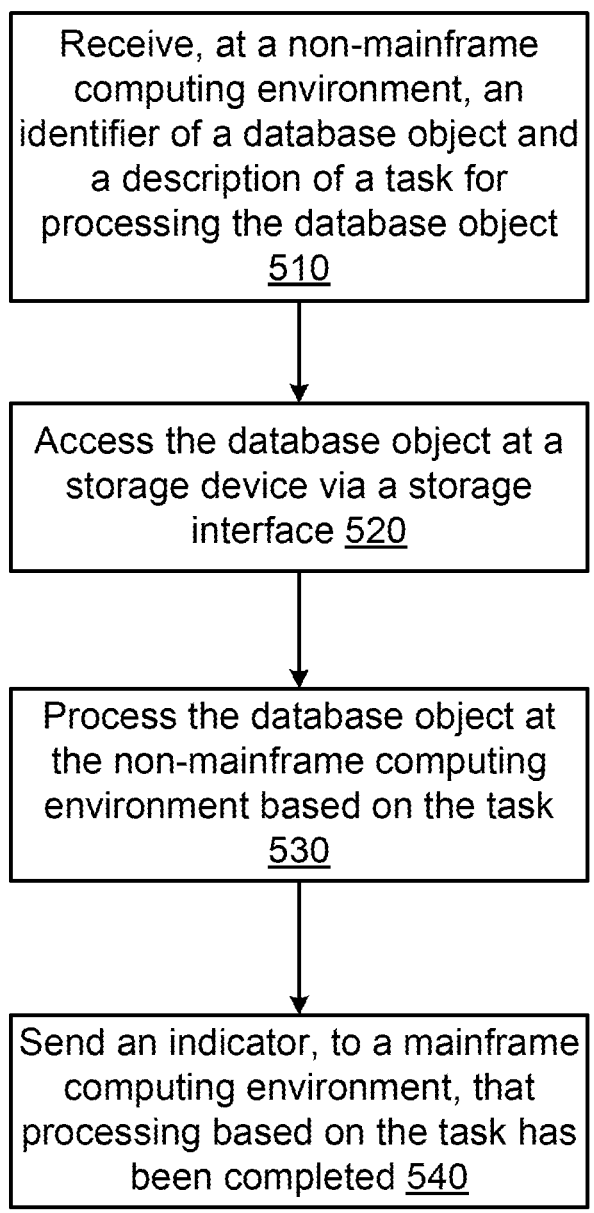
FIG. 5 is another flowchart that illustrates a method for executing a management utility process, according to an embodiment.

FIG. 5 is another flowchart that illustrates a method for executing a management utility process, according to an embodiment. One or more portions of the management utility process can be performed within a database management system (e.g., database management system 100 shown in FIG. 1).

An identifier of a database object and a description of a task for processing the database object are received within a non-mainframe computing environment (block 510). In some embodiments, the database object and the description of the task can be included in a delegation instruction received at the non-mainframe computing environment. In some embodiments, the task generator 164 of the initiation manager 160 can be configured to identify the task after the management utility process has been identified by the management utility process identifier 162 of the initiation manager 160 shown in FIG. 1.

The database object is accessed at a storage device via a storage interface (block 520). In some embodiments, the storage interface can be similar to the storage interface 130 shown in FIG. 1. In some embodiments, the storage device can be configured to store database objects using various storage formats.

The database object is processed at the non-mainframe computing environment based on the task (block 530). In some embodiments, the database object can be processed using one or more resources of the non-mainframe computing environment. In some embodiments, the task can be performed in parallel or serially with another task using one or more resources of the non-mainframe computing environment.

An indicator that processing based on the task has been completed is sent to a mainframe computing environment (block 540). In some embodiments, the indicator can be a completion indicator. In some embodiments, the termination manager 180 shown in FIG. 1 can be configured to receive the indicator. In some embodiments, at least a portion of the termination phase of the management utility process can be executed by the completion detector 182 of the termination manager 180 shown in FIG. 1.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (e.g., a computer-readable medium, a tangible computer-readable medium) or in a propagated signal, for processing by, or to control the operation of, data processing apparatus, e.g., a programmable processor, a computer, or multiple computers. In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-readable storage medium storing instructions that when executed cause a processor to perform a process, the instructions comprising instructions to:
   identify, at a mainframe computing environment during an initiation phase of a management utility process, a first set of tasks for implementing the management utility process and a first database object stored in a storage device;
   send, by the mainframe computing environment and to a non-mainframe computing environment before completion of the initiation phase and during a distribution phase of the management utility process, a first delegation instruction including a description identifying the first set of tasks, and a first identifier associated with the first database object, the non-mainframe computing environment accessing the first database object in the storage device using the first identifier when processing the first set of tasks associated with the management utility process, the processing being performed without using computing resources included in the mainframe computing environment;
   identify, at the mainframe computing environment during the initiation phase and after sending the first delegation instruction during the distribution phase, a second set of tasks for implementing the management utility process and a second database object stored in the storage device;
   send, by the mainframe computing environment and to the non-mainframe computing environment during the distribution phase, a second delegation instruction including a description identifying the second set of tasks, and a second identifier associated with the second database object, the non-mainframe computing environment accessing the second database object in the storage device using the second identifier when processing the second set of tasks associated with the management utility process, the processing being performed without using computing resources included in the mainframe computing environment;
   receive a first indicator, at the mainframe computing environment, that processing based on the first set of tasks associated with the management utility process has been completed;
   receive a second indicator, at the mainframe computing environment, that processing based on the second set of tasks associated with the management utility process has been completed; and
   execute a termination phase of the management utility process at the mainframe computing environment in response to receiving the first indicator and the second indicator.

2. The computer-readable storage medium of claim 1, wherein accessing the first database object in the storage device comprises accessing the storage device via a storage interface, and
   wherein the storage interface is configured to translate the first database object from a first format compatible with the mainframe computing environment and incompatible with the non-mainframe computing environment to a second format compatible with the non-mainframe computing environment and incompatible with the mainframe computing environment.

3. The computer-readable storage medium of claim 1, wherein the instructions to identify include instructions to identify the first set of tasks for parallel processing at a plurality of resources of the non-mainframe computing environment, and
   wherein the first delegation instruction further includes parameter values related to the first set of tasks for parallel processing, non-mainframe computing resource identifiers identifying the plurality of resources of the non-mainframe computing environment, and multiple identifiers associated with multiple database objects.

4. The computer-readable storage medium of claim 1, wherein the management utility process is a reorganization process being a combination of an unload process configured to read, process and produce a flat file from a database object and a load process configured to read a flat file and produce a database object.

5. The computer-readable storage medium of claim 1, wherein processing cycles related to the management utility process and performed at the mainframe computing environment are decreased while processing cycles related to the management utility process and performed at the non-mainframe computing environment are increased in response to the sending of the description.

6. The computer-readable storage medium of claim 1, wherein the instructions to identify, at the mainframe computing environment, include instructions to identify the first set of tasks for serial processing at a plurality of resources of the non-mainframe computing environment;
wherein the first delegation instruction further includes:
parameter values related to the first set of tasks for serial processing;
non-mainframe computing resource identifiers identifying the plurality of resources of the non-mainframe computing environment for serial processing of the first set of tasks; and
multiple identifiers associated with multiple database objects in the storage device; and
wherein accessing the multiple database objects in the storage device comprises accessing the storage device via a storage interface, the storage interface configured to, for each of the multiple database objects:
serialize the processing of the database object or a file including the database object based on at least one of the management utility process or another process; and
externalize at least a portion of the database object from the mainframe computing environment to the storage device.

7. The computer-readable storage medium of claim 1, wherein the non-mainframe computing environment includes a first resource and a second resource;
wherein sending, by the mainframe computing environment and to a non-mainframe computing environment before completion of the initiation phase and during a distribution phase of the management utility process, a first delegation instruction comprises sending the first delegation instruction to the first resource; and
wherein sending, by the mainframe computing environment and to the non-mainframe computing environment during the distribution phase, a second delegation instruction comprises sending the second delegation instruction to the second resource, wherein the second resource of the non-mainframe computing environment is configured to process the second set of tasks in parallel with the first resource of the non-mainframe computing environment processing the first set of tasks.

8. The computer-readable storage medium of claim 1, wherein the instructions further comprise instructions to:
execute a termination phase of the management utility process at the mainframe computing environment in response to receiving the first indictor and in response to determining that a time period for completing the management utility process has expired before receiving the second indicator.

9. The computer-readable storage medium of claim 1, the instructions further comprising instructions to:
update, by the mainframe computing environment, a database catalog file.

10. The computer-readable storage medium of claim 2, wherein the first format is one of a mainframe computing environment storage format, a mainframe computing environment database object format, and a count key data (CKD) storage format, and wherein the second format is one of a non-mainframe computing environment storage format, a non-mainframe computing environment database object format, and a fixed block architecture (FBA) storage format.

11. The computer-readable storage medium of claim 2, wherein the first format is a DB2 object format, wherein the second format is a flat file and wherein the storage interface is configured to translate the database object from the DB2 object format to the flat file format.

12. The computer-readable storage medium of claim 3, wherein a first task included in the first set of tasks for parallel processing includes reading the multiple database objects in parallel, a second task included in the first set of tasks for parallel processing includes combining the multiple database objects into a single database object, subsequent to reading the multiple database objects in parallel, and a third task included in the first set of tasks for parallel processing includes storing the single database object in the storage device.

13. The computer-readable storage medium of claim 1, wherein sending, by the mainframe computing environment and to the non-mainframe computing environment during the distribution phase, a second delegation instruction comprises:
sending the second delegation instruction during the distribution phase and after the completion of the initiation phase.

14. An apparatus, comprising:
a mainframe computing device configured to:
identify a first database object processing task associated with a management utility process;
identify a first database object stored in a storage device; and
send a first delegation instruction including a first identifier associated with the first database object, and a description identifying the first database object processing task;
identify, after sending the first delegation instruction, a second database object processing task associated with the management utility process;
identify a second database object stored in the storage device;
send a second delegation instruction including a second identifier associated with the second database object, and a description identifying the second database object processing task; and
a non-mainframe computing device configured to:
execute the first database object processing task and the second database processing task, the executing being performed without using computing resources included in the mainframe computing device;
receive, from the mainframe computing device, the first delegation instruction and the second delegation instruction;
access the first database object in the storage device using the first identifier and access the second database object in the storage device using the second identifier; and
send, to the mainframe computing device, a first task completion indicator indicating that the execution of the first database object processing task has been completed and a second task completion indicator indicating that the execution of the second database object processing task has been completed;
wherein the mainframe computing device is further configured to:
receive a first task completion indicator indicating that the first database object processing task has been completed;
receive a second task completion indicator indicating that the second database object processing task has been completed; and
terminate the management utility process in response to receiving the first task completion indicator and the second task completion indicator.

15. The apparatus of claim 14,
wherein an initiation manager included in the mainframe computing device is configured to:
  identify the first database object processing task and the second database object processing task;
  query the non-mainframe computing device about available resources included in the non-mainframe computing device for processing the first database object processing task and the second database object processing task;
  receive, in response to the query, at least one indicator of a first resource available for processing the first database object processing task and at least one indicator of a second resource available for processing the second database object processing task; and
  include in the first delegation instruction the at least one indicator of the first available resource; and
  include in the second delegation instruction the at least one indicator of the second available resource;
wherein the first database object processing task is executed by the first available resource included in the non-mainframe computing device,
wherein the second database object processing task is executed by the second available resource included in the non-mainframe computing device; and
wherein a termination manager included in the mainframe computing device is configured to:
  terminate the management utility process in response to receiving the first task completion indicator and the second task completion indicator.

16. The apparatus of claim 15,
wherein the mainframe computing device has a processing rate related to the management utility process that decreases relative to a processing rate related to the management utility process at the non-mainframe computing device in response to a transition from the initiation phase to the distribution phase.

17. The apparatus of claim 14, further comprising:
a storage interface operatively coupled to the non-mainframe computing device, wherein the storage device is operatively coupled to the storage interface, and the non-mainframe computing device is configured to:
  receive a description of the first database object processing task from the mainframe computing device; and
  trigger the storage interface to retrieve the first database object from the storage device based on the description of the first database object processing task; and
the storage interface is configured to convert the first database object from a first format compatible with the mainframe computing device and incompatible with the non-mainframe computing device to a second format compatible with the non-mainframe computing device and incompatible with the mainframe computing device when retrieving the first database object from the storage device.

18. A computer-readable storage medium storing instructions that when executed cause a processor to perform a process, the instructions comprising instructions to:
  receive, at a non-mainframe computing environment and from a mainframe computing environment, a first identifier associated with a first database object stored in a storage device, and a description of a first task for processing the first database object;
  receive, at the non-mainframe computing environment and from the mainframe computing environment, a second identifier associated with a second database object stored in a storage device, and a description of a second task for processing the second database object;
  perform, by the non-mainframe computing environment and based on receiving the description of the first task and the description of the second task, a management utility process without using computing resources included in the mainframe computing environment, the performing including:
    accessing, by the non-mainframe computing environment, the first database object at the storage device using the first identifier;
    processing the first database object at the non-mainframe computing environment based on the first task;
    storing, by the non-mainframe computing environment, the processed first database object in the storage device using the first identifier;
    accessing, by the non-mainframe computing environment, the second database object at the storage device using the second identifier;
    processing the second database object at the non-mainframe computing environment based on the second task; and
    storing, by the non-mainframe computing environment, the processed second database object in the storage device using the second identifier;
  send a first indicator, by the non-mainframe computing environment and to a mainframe computing environment, that processing based on the first task has been completed; and
  send a second indicator, by the non-mainframe computing environment and to a mainframe computing environment, that processing based on the second task has been completed the first indicator and the second indicator for use by the mainframe computing environment to determine if a termination phase of the management utility process should be performed.

19. The computer-readable storage medium of claim 18, wherein accessing the first database object at the storage device comprises accessing the storage device via a storage interface, the storage interface configured to:
  translate the first database object to a first storage format compatible with the non-mainframe computing environment; and
  translate the first database object to a second storage format compatible with the mainframe computing environment, the translation being performed after the processing of the first database object at the non-mainframe computing environment based on the task; and wherein storing the processed first database object in the storage device comprises storing the first database object that has been translated to the second storage format.

20. The computer-readable storage medium of claim 18, the instructions further comprising instructions to:
  update, by the non-mainframe computing environment, a database catalog file.

* * * * *